Patented Dec. 24, 1946

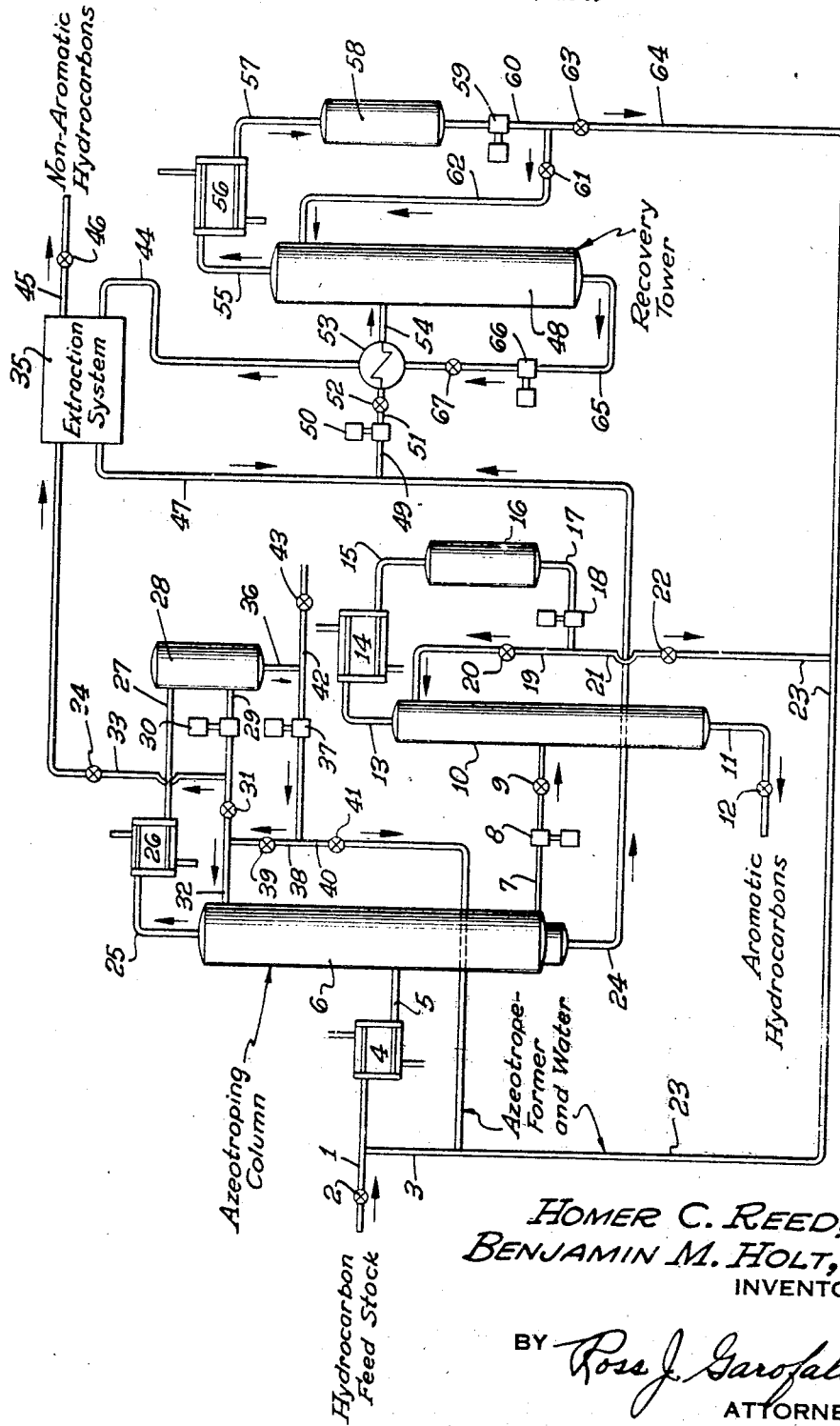

2,413,245

UNITED STATES PATENT OFFICE 2,413,245

AZEOTROPIC DISTILLATION OF TOLUENE

Homer C. Reed, Glendale, and Benjamin M. Holt, Berkeley, Calif., assignors to Union Oil Company of California, Los Angeles, Calif., a corporation of California Application October 6, 1943, Serial No. 505,150

11 Claims. (Cl. 202—42)

This invention relates to the separation of aromatic type hydrocarbons from non-aromatic type hydrocarbons of similar volatility, by azeotropic distillation, and relates especially to an improvement in the process for obtaining substantially pure toluene from mixtures which also contain non-aromatic hydrocarbons of similar volatility, by means of azeotropic distillation with methyl ethyl ketone in the presence of water.

Hydrocarbon mixtures from various sources, such as crude oil, coal tar, shale oil, products from conversion of these materials and products of syntheses such as the Fischer-Tropsch synthesis, etc., all generally contain aromatic hydrocarbons in small to very substantial proportions, but it has been found to be extremely difficult to separate pure aromatic hydrocarbon from any of these mixtures which contain appreciable amounts of non-aromatic hydrocarbons by simple fractional distillation because of the similarity in volatility of the aromatics and many of the non-aromatics present in the mixture. Azeotropic distillation of such mixtures with a suitable azeotrope-former, however, has been found to be an effective means of separation. For example, toluene of better than 99% purity, suitable for nitration to TNT, has been prepared from hydrocarbon mixtures of limited boiling range close to the boiling point of toluene, by distilling these mixtures in the presence of methyl ethyl ketone (MEK) whereby the non-aromatic hydrocarbons present in the mixture form azeotropes with the MEK. These azeotropes boil well below the boiling point of the toluene, which apparently forms no azeotrope with MEK, and the non-aromatics and MEK may be taken overhead in the distillation, leaving a bottoms fraction in which the toluene in concentrated. The efficiency of the fractionation equipment, i. e., the number of theoretical plates required for the azeotropic distillation in order to produce toluene of purity greater than 99%, is moderate, in the neighborhood of 40 to 60 plates, whereas by distillation of the same mixture without the azeotrope-former in a column having 150 plates it is doubtful if toluene of better than 90% purity could be obtained.

In carrying out azeotropic distillation on a commercial scale, it is necessary to have an efficient system for recovery of azeotrope-former, since this is generally a relatively expensive commodity. This recovery is generally accomplished by processes involving extraction and distillation. For example, MEK may be extracted from its solution in non-aromatic hydrocarbons with water, and the MEK may then be separated from the water in the extract, by simple distillation. In this latter distillation when conducted at substantially atmospheric pressure, the MEK forms an azeotrope with water, which contains about 10% of water. Separation of this azeotrope from the bottoms water fraction requires a distillation column of moderate efficiency and rather large diameter, since large volumes of water are necessary in the extraction step if efficient recovery of MEK is to be attained. Similar considerations apply to azeotroping processes for recovering aromatics with azeotrope-formers other than MEK, and solvents other than water.

An azeotropic distillation system has now been discovered which provides for a maximum efficiency of separation of aromatics from non-aromatics, with a minimum of equipment. The system is exemplified in the attached drawing, which shows one mode of operation of the process of our invention.

Referring to the figure, a hydrocarbon feed stock containing both aromatic and non-aromatic hydrocarbons of similar volatility is introduced into line 1 through control valve 2, and mixed with azeotrope-former and water entering through line 3. The combined stream is heated in heater 4 and passes through line 5 into azeotroping column or tower 6. The bottoms from this tower are allowed to separate in the base of the tower into two phases. The hydrocarbon phase consisting of aromatic hydrocarbons and a small amount of azeotrope-former, leaves the column through line 7 and is charged to fractionating column 10 via pump 8 and valve 9. In column 10, the azeotrope-former is taken overhead together with a small amount of aromatic hydrocarbon, and the bottoms fraction, consisting of aromatic hydrocarbons substantially free from azeotrope-former is withdrawn through line 11 and valve 12. The overhead from column 10 passes through line 13, condenser 14 and line 15 to drum 16, from which it is withdrawn through line 17 and pump 18 and split into two parts. One part is returned to column 10 as reflux, through line 19 and valve 20, and the remainder is returned to azeotroping column 6 through line 21, valve 22, lines 23 and 3, heater 4 and line 5. The aqueous phase separated in the base of column 6 is withdrawn through line 24 and sent to the azeotrope-former recovery system as described later, for recovery of its small content of azeotrope-former.

The overhead from column 6 leaves through line 25 and is condensed and cooled in condenser 26. The condensate passes through line 27 to settling drum 28, where it separates into two phases, a hydrocarbon phase consisting principally of non-aromatic hydrocarbons and azeotrope-former, with only a small amount of dissolved water, and an aqueous phase consisting essentially of a major proportion of water and a minor proportion of azeotrope-former. The hydrocarbon phase is drawn off through line 29 and pump 30, and part of it is returned to azeotropic column 6 as reflux, through valve 31 and line 32, while the remainder passes through line 33 and valve 34 to extraction system 35. The aqueous phase from settler 28 is returned to column 6, either as reflux, through line 36, pump 37, line 38, valve 39 and line 32, or as feed, through line 36, pump 37, line 40, valve 41, lines 3 and 1, heater 4 and line 5. If desired, part of this aqueous phase may be withdrawn, or additional water may be added, through line 42 and valve 43.

In extraction system 35, the hydrocarbon phase from settler 28 is scrubbed with water entering through line 44, whereby the oil is freed from azeotrope-former, and leaves the system through line 45 and valve 46. The water and dissolved azeotrope-former leave the extraction system through line 47, join the aqueous stream leaving the bottom of column 6 through line 24, and pass into recovery tower 48 through line 49, pump 50, line 51, valve 52, heat exchanger 53 and line 54. The overhead from recovery tower 48 consisting predominantly of azeotrope-former with some water, passes through line 55, condenser 56, and line 57 to drum 58. From drum 58 it is pumped through pump 59 and line 60, returning part of the stream to recovery column 48 as reflux, through valve 61 and line 62, and the remainder to azeotroping column 6 through valve 63, lines 64, 23, 3, etc. The bottoms from recovery tower 48, consisting substantially of water, are drawn off through line 65, and are recirculated to extraction system 35 through pump 66, valve 67, heat exchanger 53 and line 44.

In the above system, the non-aromatic hydrocarbon fraction leaving extraction system 35 through line 45 generally contains a small amount of azeotrope-former. This may be recovered by employing a distillation step similar to that shown for the aromatic hydrocarbon fraction leaving the bottom of column 6 through line 7. In this distillation step a bottoms fraction consisting of non-aromatic hydrocarbons containing only negligible amounts of azeotrope-former may be obtained, while the overhead fraction, comprising substantially all the azeotrope-former and a small amount of non-aromatic hydrocarbons, is either returned to azeotroping column 6, or is subjected to a secondary water extraction, combining the extracted hydrocarbons with the non-aromatic hydrocarbon bottoms from the preceding distillation, and combining the extract phase with the extract phase from extraction system 35.

By the above method of operation, unusual efficiency may be obtained. For example, in the preparation of toluene by a MEK azeotroping operation, a feed stock was employed which was produced by hydroforming or cracking a California crude gasoline in the presence of hydrogen, and fractionating the hydroformed product to obtain a toluene heart cut having a gravity of about 47° A. P. I., a toluene content of about 35%, a non-aromatic hydrocarbon content of about 65%, including about 7% of olefinic hydrocarbons, and a boiling range of about 210° F. to 230° F.

The above feed stock was preheated to about 195° F. and charged to about the middle of an azeotroping column such as column 6, at a rate of about 1420 barrels per day (B./D.). Just prior to the preheating step it was mixed with a stream consisting of about 2200 B./D. of MEK and 400 B./D. of water, from recovery tower 48, and a stream consisting of about 19 B./D. of MEK and 47 B./D. of toluene, from tower 10, and a stream consisting of about 114 B./D. of MEK and about 456 B./D. of water, from the bottom of overhead separator 28.

The azeotropic distillation was carried out in column 6 at approximately atmospheric pressure and an overhead fraction was taken which was condensed, cooled to about 80° F. and separated in separator 28 into two phases. The entire aqueous phase consisting of about 114 B./D. of MEK and about 456 B./D. of water, was recirculated to the feed to column 6 as described above. Of the hydrocarbon phase, about two-thirds was returned as reflux to column 6, and the remaining one-third, consisting of about 930 B./D. of non-aromatic hydrocarbons, 10 B./D. of toluene, 2200 B./D. of MEK, and 98 B./D. of water, was sent to extraction system 35.

From the separator at the base of column 6, about 302 B./D. of aqueous phase containing about 0.6% MEK was separated, and sent to recovery tower 48 as described below. The toluene phase from this separator, consisting of about 19 B./D. of MEK and about 527 B./D. of toluene was charged directly to tower 10, from which a flash distillate consisting of about 19 B./D. of MEK and 47 B./D. of toluene was returned to azeotroping tower 6 as noted above. The bottoms fraction consisted essentially of 480 B./D. of toluene of about 99.1% purity, the remaining 0.9% being substantially all olefins.

The non-aromatic hydrocarbon phase production from the upper part of separator 28, containing the bulk of the MEK, as described above, was contacted in extraction system 35 with about 8710 B./D. of wash water in 4 countercurrent stages. This gave a raffinate hydrocarbon fraction consisting of about 940 B./D. of non-aromatic hydrocarbons (including only about 1% of toluene) and about 37 B./D. of MEK, and an aqueous extract consisting of about 8800 B./D. of water, and nearly 2200 B./D. of MEK.

The raffinate fraction above was distilled in a raffinate re-run tower to obtain a bottoms fraction of pure hydrocarbons and an overhead consisting of about 73 B./D. of hydrocarbons and 37 B./D. of MEK. This overhead fraction was extracted at approximately atmospheric temperature in a secondary extraction tower with about 290 B./D. of water to obtain a secondary raffinate, and a secondary extract. The secondary raffinate, free from MEK, was combined with the bottoms from the raffinate rerun tower to obtain a total of about 940 B./D. of raffinate consisting essentially of non-aromatic hydrocarbons and containing only about 1% of toluene.

The secondary extract from the above operation, the extract from extraction system 35, and the aqueous phase from the bottom of azeotroping column 6 were all combined and charged to recovery tower 48. The overhead fraction taken in tower 48 consisted of about 85% MEK and 15% water, i. e. about 2200 B./D. of MEK and about 400 B./D. of water. This fraction was recycled to azeotroping tower 6 as noted above. The bottoms fraction from tower 48 consisting of about 9000 B./D. of substantially pure water, was recycled largely to the extraction system 35, with a small part also going to the raffinate secondary extraction system as described above.

There are two features of especial interest in the above process, namely the efficiency of the azeotroping operation as carried out in column 6, and the efficiency of the recovery of azeotrope-former from the water extract in column 48. In column 48, it was found that the above throughput rates could be maintained easily in a 12 plate column of only 56 in. I. D., providing that an overhead product was taken which contained only 85% MEK rather than the 90% MEK found in the normal MEK-water azeotrope. It was found that when the same column was employed and the temperatures were reduced sufficiently to obtain the 90% MEK azeotrope as the overhead, the maximum MEK throughput rate obtainable without flooding of the column was only about two-thirds of the above value. Although 85% appeared to be the optimum proportion of MEK in the overhead, markedly improved throughput rates were obtainable throughout the range of about 70% to about 88% MEK. Similar benefits were obtained with azeotrope-formers other than MEK and solvents other than water, over a similar range of abnormal proportions of solvent, providing that the solvent had a higher molal heat of vaporization than the azeotrope-former. This is the case with azeotrope-formers such as methyl alcohol, and acetone for example, and solvents such as glycerine and ethylene glycol, for example, although water is the preferred solvent.

It might be expected that the use of 85% MEK in column 6 rather than 90% to 100% MEK might make the azeotroping process less efficient due to the excess water contamination. In fact it was found that this was true when the water was produced exclusively in the overhead. By reducing the column temperatures sufficiently to produce the water in the bottoms fraction however, and recycling the entire aqueous phase from the overhead as described above, it was found that the above 99+% pure toluene was obtained with 98% recovery in a 50 plate column of about 38 theoretical plate efficiency. When the same column was employed in a similar operation in which the water was taken overhead it was found to be impossible to obtain a bottoms toluene fraction of better than about 91% purity. The improved results with water production at the bottom of the column may be due to the tendency of the water to carry MEK with it as it travels down the column.

Our invention lies, therefore, in the above efficient type of azeotroping process, wherein an azeotrope-former mixture containing a solvent having a higher molal heat of vaporization than that of the azeotrope-former is employed, and at least a substantial proportion of the solvent and a minor proportion of the azeotrope-former are removed at the bottom of the azeotroping tower; the major proportion of the azeotrope-former is taken overhead and is separated from the hydrocarbon also taken overhead by extraction with the solvent, and the azeotrope-former is separated from the solvent by a distillation in which the azeotrope-former is taken overhead together with an abnormal proportion of solvent. By "abnormal" as used herein in this connection is meant more than about 5% by volume where no azeotrope between the azeotrope-former and solvent exists, or substantially more than the amount present in the normal azeotrope, when such an azeotrope exists, but in no case more than about 30% by volume. For MEK-water forming a normal azeotrope containing 10% water for example, the "abnormal" range would be about 12% to about 30% water, as noted above.

The solvent must not only have a high molal heat of vaporization, as described above, but must be substantially insoluble in the hydrocarbons with which the azeotrope-former is associated, and have a high solvent power for the azeotrope-former. It should also be less volatile than the azeotrope-former.

The azeotrope-former should have a volatility similar to that of the hydrocarbon feed stock, and preferably should boil within about 80° F. of the boiling point of the aromatic hydrocarbon to be concentrated. It should form azeotropes with the non-aromatic hydrocarbons which are associated with the desired aromatic hydrocarbon, and these azeotropes should boil substantially lower than the boiling point of the aromatic hydrocarbons. It should either form no azeotrope with the aromatic hydrocarbon, or form such an azeotrope having a substantially higher boiling point than those of the azeotropes with the non-aromatic hydrocarbons. The above restrictions regarding azeotrope-formation should also apply to the mixtures of azeotrope-former and solvent employed in the azeotroping step.

The hydrocarbon feed stock should have a narrow boiling range, generally from not over about 20° F. below that of the aromatic hydrocarbon, to not over about 10° F. above that of the aromatic hydrocarbon.

Although the process has been described as particularly applicable to the separation of non-aromatic hydrocarbons such as paraffins, naphthenes and olefins from aromatic hydrocarbons such as benzene, toluene, xylene, and the like, it is apparent that the principles are applicable to the separation of non-aromatic hydrocarbons from phenols, sulfur compounds or like materials which have lesser tendencies to form azeotropes.

Examples of azeotrope-formers other than MEK suitable for the purposes of this invention are other ketones, such as diethyl ketone, methyl isobutyl ketone and the like; alcohols, whether primary, secondary or tertiary, such as the butyl alcohols, propyl alcohols, methyl alcohol, ethyl alcohol and the like; heterocyclic compounds such as dioxane, morpholine and the like; and other materials which are similarly effective.

Examples of solvents other than water and glycols such as those mentioned above, which may be employed for extraction of the azeotrope-formers are phenolic materials such as resorcinol, parachlorophenol and the like; amines whether mono, di or other poly-amines such as the ethanolamines, tetraethylene pentamine, aniline, and the like; carboxylic acids such as acetic, propionic, and the like; nitro-organic compounds such as nitromethane and the like, and other compounds which have the above desired characteristics. Combinations of solvents, especially combinations of water with other solvents, may be used. Extraction temperatures and amounts of solvent employed may be varied to attain the desired separation.

There is an additional feature which may be employed in connection with the above process. It is frequently necessary to refine the aromatic hydrocarbon product withdrawn from the bottom of tower 10 to make it suitable for many purposes. The toluene of the above specific example, for instance, contained nearly 1% of olefins and required refining before use as nitration grade toluene. The refining, including the removal of olefins, sulfur compounds, color forming bodies and the like, may be carried out effectively by treatment of the aromatic hydrocarbon with concentrated sulfuric acid, whereby some of the contaminating materials are absorbed and others form sulfuric acid reaction products or polymers of higher boiling point. The separation of these higher boiling materials from the refined aromatic hydrocarbon requires efficient fractional distillation to prevent loss of refined aromatics, but it must also be carried out without subjecting the material to temperatures above 300° F., since at these higher temperatures there is a strong tendency to decompose the higher boiling materials and form acidic gases such as SO₂ and low boiling hydrocarbons, which tend to corrode the equipment and degrade the quality of the distilled aromatics. Since such efficient fractionation generally requres high bottoms temperatures, this distillation generally requires the use of vacuum, or excessive amounts of steam and therefore large diameter columns having theoretical plates. It has now been found that moderate sized columns may be employed without excessive steam consumption and low bottoms temperatures may be employed without loss of toluene by employing the following method.

According to this improved method, a moderate sized column is used, without excessive steam, and a low bottoms temperature is employed, and some aromatics are allowed to be removed at the bottom of the column with the polymers. These aromatics are not lost, however, but are recovered, simply by recycling this bottoms fraction to the fractionation system in which the hydrocarbon feed to the azeotroping column is prepared. Thus, the aromatics contained in the bottoms fraction are separated from the polymers in this feed preparation system, and is recycled through the azeotroping process. For example, in the toluene process described above, the 480 B./D. of toluene from the bottom of tower 10 was treated with 15 lb. of 98% sulfuric acid per barrel, the sludge was removed and the oil successively washed with water and caustic to obtain 477 B./D. of treated toluene. This was distilled in a 30 plate column of 4 ft. diameter at a bottoms temperature of only 260° F., using sufficient steam to take 98% or 470 B./D. of refined toluene overhead, and leave 7 B./D. of bottoms comprising toluene and polymers. This bottoms fraction was recirculated to the final feed preparation column wherein the feed was cut to an end-point of about 230° F., thereby effectively separating the polymers and including the toluene in the feed to column 6.

Modifications of the above process which are not covered in the prior art and which would occur to one skilled in the art are to be included in the invention as defined in the following claims.

We claim:
1. In a continuous process wherein aromatic hydrocarbons are separated from non-aromatic hydrocarbons of similar volatility by distillation of a mixture of such hydrocarbons in the presence of an azeotrope-former having a volatility similar to that of the hydrocarbons, and a solvent of lesser volatility which is substantially insoluble in the hydrocarbons and has a higher molal heat of vaporization than the azeotrope-former, the steps which comprise distilling said hydrocarbon mixture in the presence of said azeotrope-former and said solvent, so as to obtain a distillate comprising substantially all of the non-aromatic hydrocarbons, the major proportion of the azeotrope-former and solvent, and a bottoms fraction comprising substantially pure aromatic hydrocarbons and a minor proportion of azeotrope-former and solvent; condensing and cooling said distillate causing it to separate into two phases, a solvent phase containing a major proportion of azeotrope-solvent and a minor proportion of azeotrope-former, and a hydrocarbon phase consisting predominantly of non-aromatic hydrocarbon and azeotrope-former; separating the azeotrope former-azeotrope-former from the hydrocarbons in said hydrocarbon phase by a process involving selective solution of the azeotrope-former in said solvent; separating said azeotrope-former from said solvent by a distillation process wherein substantially all of the azeotrope former is vaporized and distilled together with a portion of the solvent, the ratio of said solvent to azeotrope former in the distillate being greater than the ratio of solvent to azeotrope former contained in the distillate of said first named distillation, leaving substantially pure solvent as bottoms; and recycling the distillate comprising azeotrope-former and abnormal proportion of solvent to the azeotropic distillation step.

2. A process according to claim 1 in which the aromatic hydrocarbon is toluene and the azeotrope-former is methyl ethyl ketone.

3. A process according to claim 1 in which the aromatic hydrocarbon is toluene, the azeotrope-former is methyl-ethyl ketone, the solvent is water and the said portion of water taken overhead in the separation of the solvent and azeotrope-former amounts to about 12% to about 30% of the total distillate.

4. A continuous process for the separation of toluene from a hydrocarbon mixture containing toluene and non-aromatic hydrocarbons of similar volatility which comprises azeotropically distilling said hydrocarbon mixture in the presence of methyl ethyl ketone and water so as to obtain an overhead fraction containing substantially all of the non-aromatic hydrocarbons, the major proportion of the methyl ethyl ketone, and water, and a bottoms fraction containing substantially all of the toluene, some methyl ethyl ketone, and water; condensing and cooling said overhead fraction so as to cause it to separate into two phases, an aqueous phase containing a major proportion of water and a minor proportion of methyl ethyl ketone, and a hydrocarbon phase consisting predominantly of non-aromatic hydrocarbons and methyl ethyl ketone; separating said bottoms fraction into two phases, an aqueous phase containing a major proportion of water and a minor proportion of methyl ethyl ketone, and a toluene phase containing a major proportion of toluene and a minor proportion of methyl ethyl ketone; recycling said aqueous phase of the overhead fraction to the azeotropic distillation step; subjecting said hydrocarbon phase of the overhead fraction to extraction with water so as to obtain an aqueous extract containing a major proportion of water and a minor proportion of methyl ethyl ketone, and a hydrocarbon raffinate phase containing a major proportion of non-aromatic hydrocarbons and a minor proportion of methyl ethyl ketone; combining said aqueous extract from the extraction step with said aqueous phase of the bottoms fraction from the azeotropic distillation step and distilling the resulting mixture so as to obtain a non-azeotropic overhead fraction containing a major proportion of methyl ethyl ketone and between about 12% and about 30% of water, and a bottoms fraction consisting of substantially pure water, recycling said bottoms fraction to the extraction step, and recycling said overhead fraction to the azeotropic distillation step; recovering substantially pure non-aromatic hydrocarbons from the hydrocarbon raffinate phase from the extraction step; and recovering substantially pure toluene from the toluene phase of the bottoms fraction from the azeotropic distillation step.

5. A process according to claim 4 in which the toluene recovered is acid treated and redistilled at a bottoms temperature below 300° F., and the bottoms fraction from this distillation is recycled to a hydrocarbon feed preparation system wherein the hydrocarbon feed to the azeotropic distillation step is prepared and any toluene contained in said recycled bottoms is recovered and included in said hydrocarbon feed to the azeotropic distillation step.

6. A continuous process for the separation of toluene from a hydrocarbon mixture containing toluene and non-aromatic hydrocarbons of similar volatility which comprises azeotropically distilling said hydrocarbon mixture in the presence of methyl ethyl ketone and water so as to obtain an overhead fraction enriched in the non-aromatic hydrocarbons, and containing the major proportion of the methyl ethyl ketone, and water, and a bottoms fraction enriched in toluene, and containing some methyl ethyl ketone, and water; condensing and cooling said overhead fraction so as to cause it to separate into two phases, an aqueous phase containing a major proportion of water and a minor proportion of methyl ethyl ketone, and a hydrocarbon phase consisting predominantly of non-aromatic hydrocarbons and methyl ethyl ketone; separating said bottoms fraction into two phases, an aqueous phase containing a major proportion of water and a minor proportion of methyl ethyl ketone, and a toluene phase containing a major proportion of toluene and a minor proportion of methyl ethyl ketone; recycling said aqueous phase of the overhead fraction to the azeotropic distillation step; subjecting said hydrocarbon phase of the overhead fraction to extraction with water so as to obtain an aqueous extract containing a major proportion of water and a minor proportion of methyl ethyl ketone, and a hydrocarbon raffinate phase containing a major proportion of non-aromatic hydrocarbons and a minor proportion of methyl ethyl ketone; combining said aqueous extract from the extraction step with said aqueous phase of the bottoms fraction from the azeotropic distillation step and distilling the resulting mixture so as to obtain a non-azeotropic overhead fraction containing a major proportion of methyl ethyl ketone and between about 12% and about 30% of water, and a bottoms fraction consisting of substantially pure water, recycling said bottoms fraction to the extraction step, and recycling said overhead fraction to the azeotropic distillation step; recovering a hydrocarbon fraction enriched in non-aromatic hydrocarbons from the hydrocarbon raffinate phase from the extraction step; and recovering a hydrocarbon fraction enriched in toluene from the toluene phase of the bottoms fraction from the azeotropic distillation step.

7. A process according to claim 1 in which the said portion of solvent vaporized and distilled in the separation of solvent and azeotrope-former amounts to about 12% to about 30% of the total distillate.

8. A continuous process for the separation of aromatic hydrocarbons from a hydrocarbon mixture containing aromatic hydrocarbons and non-aromatic hydrocarbons of similar volatility which comprises azeotropically distilling said hydrocarbon mixture in the presence of an azeotrope-former and a solvent so as to obtain an overhead fraction containing substantially all of the non-aromatic hydrocarbons, the major proportion of the azeotrope-former and solvent and a bottoms fraction containing substantially all of the aromatic hydrocarbons, some azeotrope-former and solvent; condensing and cooling said overhead fraction so as to cause it to separate into two phases, a solvent phase containing a major proportion of solvent and a minor proportion of azeotrope-former and a hydrocarbon phase consisting predominantly of non-aromatic hydrocarbons and azeotrope-former; separating said bottoms fraction into two phases, a solvent phase containing a major proportion of solvent and a minor proportion of azeotrope-former and an aromatic hydrocarbon phase containing a major proportion of aromatic hydrocarbons and a minor proportion of azeotrope-former; recycling said solvent phase of the overhead fraction to the azeotropic distillation step; subjecting said hydrocarbon phase of the overhead fraction to extraction with solvent so as to obtain a solvent extract containing a major proportion of solvent and a minor proportion of azeotrope-former and a hydrocarbon raffinate phase containing a major proportion of non-aromatic hydrocarbons and a minor proportion of azeotrope-former; combining said solvent extract from the extraction step with said solvent phase of the bottoms fraction from the azeotropic distillation step and distilling the resulting mixture so as to obtain a non-azeotropic overhead fraction containing a major proportion of azeotrope-former and between about 12% and about 30% of solvent, and a bottoms fraction consisting of substantially pure solvent, recycling said bottoms fraction to the extraction step and recycling said overhead fraction to the azeotropic distillation step; recovering substantially pure non-aromatic hydrocarbons from the hydrocarbon raffinate phase from the extraction step; and recovering substantially pure aromatic hydrocarbons from the aromatic hydrocarbon phase of the bottoms fraction from the azeotropic distillation step.

9. A process according to claim 8 in which the aromatic hydrocarbon is toluene.

10. A process according to claim 8 in which the solvent is water.

11. A process according to claim 8 in which the azeotrope-former is methyl ethyl ketone.

HOMER C. REED.
BENJAMIN M. HOLT.